United States Patent [19]

Fauteux et al.

[11] Patent Number: 5,591,544
[45] Date of Patent: * Jan. 7, 1997

[54] CURRENT COLLECTOR DEVICE

[75] Inventors: Denis G. Fauteux, Acton; Arthur A. Massucco, Natick; Ronnie D. Wilkins, Melrose; Jie Shi, Arlington, all of Mass.

[73] Assignee: Arthur D. Little, Inc., Cambridge, Mass.

[*] Notice: The term of this patent shall not extend beyond the expiration date of Pat. No. 5,578,396.

[21] Appl. No.: 399,192

[22] Filed: Mar. 6, 1995

Related U.S. Application Data

[62] Division of Ser. No. 325,994, Oct. 19, 1994.

[51] Int. Cl.$^6$ .................................................. H01M 4/64
[52] U.S. Cl. ............................................ 429/209; 429/245
[58] Field of Search ................................... 429/112, 209, 429/245, 241, 218

[56] References Cited

U.S. PATENT DOCUMENTS

| | | | |
|---|---|---|---|
| 4,110,516 | 6/1977 | Breiter | 429/104 |
| 4,216,275 | 8/1980 | Hartmann et al. | 429/104 |
| 4,492,021 | 1/1985 | Wright et al. | 429/104 X |
| 4,497,882 | 2/1985 | Mikkor | 429/163 |
| 4,547,442 | 10/1985 | Besenhard et al. | 429/209 |
| 4,689,475 | 8/1987 | Kleiner et al. | 219/553 |
| 4,925,751 | 5/1990 | Shackle et al. | 429/218 X |
| 4,948,685 | 8/1990 | Ohsawa et al. | 429/213 |
| 5,047,302 | 9/1991 | Bittihn et al. | 429/212 X |
| 5,330,856 | 7/1994 | Gonzalez | 429/212 |
| 5,399,447 | 3/1995 | Chaloner-Gill et al. | 429/191 |

FOREIGN PATENT DOCUMENTS

| | | | |
|---|---|---|---|
| 63-314762 | 12/1988 | Japan | H01M 4/04 |
| 4149960 | 11/1990 | Japan | H01M 4/64 |
| 4215246 | 6/1992 | Japan | H01M 4/02 |
| 9100624 | 1/1991 | WIPO | H01M 4/40 |

*Primary Examiner*—Anthony Skapars
*Attorney, Agent, or Firm*—Dick and Harris

[57] ABSTRACT

A current collector device for a rechargeable electrolytic cell and method for manufacturing same. The device includes an aluminum current collector having a substantially reduced oxidation layer relative to its native oxide layer, to, in turn, exhibit a relatively low interfacial impedance. A layer of electrode material is applied and adhered to the surface of the aluminum current collector to enable electrochemical activity with the particular ions in an electrolyte within the electrolytic cell. A primer may be applied between the electrode material and the aluminum current collector, wherein the primer serves to substantially preclude regrowth of the oxide layer which would otherwise occur absent such a primer.

9 Claims, 4 Drawing Sheets

CURRENT COLLECTOR DEVICE

This application is a division of application No. 08/325,994, filed Oct. 19, 1994, (status pending).

BACKGROUND OF THE INVENTION

1. Field of the Invention

The present invention relates in general to current collectors and methods for manufacturing same, and, more particularly to a current collector device wherein an aluminum current collector having a reduced interfacial impedance, relative to other aluminum current collectors, is utilized.

2. The Prior Art

Various types of current collector devices for use in association with solid and/or liquid electrolytes have been known in the art for several years. For example, when used in association with rechargeable lithium batteries, such current collectors have typically been constructed from nickel or aluminum. While both of such materials have proven as functional alternatives in such rechargeable batteries, they do, nonetheless, exhibit several deficiencies.

Specifically, nickel, in addition to its high cost, has a density of 8.90 g/cc. As a result of the use of such a relatively high density current collector, electrodes constructed using such a current collector exhibit a relatively low energy density. Furthermore, as known in the art, nickel oxidizes at a potential above 4 volts versus $Li^+/Li°$, and therefore, nickel current collectors cannot be used effectively at electrode voltages above that value.

Aluminum, on the other hand, which is quite inexpensive and which has a density of only 2.7 g/cc, eliminates the disadvantages associated with the use of nickel. Unfortunately, current collectors constructed from aluminum exhibit a relatively high interfacial impedance associated to the presence of a thick oxide layer at its surface, which, in turn, results in a loss of energy and reduced power. Indeed, such a loss of energy and power is generally attributable to the fact that aluminum includes a native oxide layer which 1) acts as an insulator, and thus severely limits electrical conductivity, and 2) greatly hinders adhesion of an electrochemically active electrode material which is to be directly, or indirectly applied to the surface of the aluminum current collector.

It is thus an object of the present invention to provide a current collector device and method of manufacturing same, wherein the device so made includes an aluminum current collector having a substantially reduced interfacial impedance and substantially increased adhesive capabilities relative to the prior art.

These and other objects of the present invention will become apparent in light of the present Specification, Claims and Drawings.

SUMMARY OF THE INVENTION

The present invention comprises a current collector device for an electrolytic cell (or rechargeable battery). The device includes a current collector substantially constructed from aluminum. The device further includes means for lowering the interfacial impedance of the aluminum current collector as well as including a layer of electrode material which is applied and adhered to at least a portion of the aluminum current collector. The layer of electrode material applied to the current collector device enables electrochemical activity with particular ions in an electrolyte within the electrolytic cell.

In a preferred embodiment of the invention, the current collector device further comprises means for improving adhesion of the layer of electrode material to the aluminum current collector. It is contemplated that such adhesion means include a plurality of pores formed in the aluminum current collector. These pores may either extend entirely through the current collector and/or alternatively, they may only partially penetrate into the current collector to, in turn, create a crater-like appearance.

Also in a preferred embodiment, the aluminum current collector includes a substantially reduced oxidation layer relative to its native oxide layer. Furthermore, means are provided to substantially preclude re-growth of an oxide layer on the aluminum current collector surface. Such means for substantially precluding the re-growth may comprise a primer applied to the surface of the aluminum current collector. Accordingly, when the primer is utilized, the layer of electrode material which enables electrochemical activity will be applied directly to the primer, and, in turn, adjacent the electrolyte within the electrolytic cell.

The primer comprises a material which is substantially electrochemically stable and substantially chemically stable relative to the electrolyte and other electrode components within the electrolytic cell. Indeed, in one preferred embodiment, the primer includes carbon, such as graphite or carbon black—although other highly organized and non-organized carbons are likewise contemplated. Alternatively, the primer may comprise a compound selected from the group of materials comprising carbon and a transition metal oxide, including, but not limited to, $LiMn_2O_4+C$; $LiCoO_2+C$; and $LiNiO_2+C$.

It is also contemplated that the layer of electrode material which enables electrochemical activity include an intercalation compound selected from the group comprising transition metal oxides, including, but not limited to (alone, or in combination with other intercalation compounds), $LiCoO_2$; $LiMn_2O_4$; $LiNiO_2$; $LiV_3O_8$; $V_2O_5$; and $V_6O_{13}$.

The present invention also contemplates a method of manufacturing an aluminum current collector for an electrolytic cell, wherein the aluminum current collector includes a substantially hydrophobic surface layer and an oxide layer thereon. The method comprises the steps of a) removing the native oxide layer from the aluminum current collector to, in turn, substantially lower interfacial impedance of the aluminum current collector; b) converting the hydrophobic surface layer of the aluminum current collector to a surface layer which is substantially hydrophilic; c) forming a plurality of pores in the aluminum current collector; and d) applying, and, in turn, adhering, a layer of electrode material to the porous and substantially hydrophilic surface of the aluminum current collector. The layer of electrode material enables electrochemical activity with particular ions in an electrolyte associated with the electrolytic cell.

The step of converting the hydrophobic surface layer of the aluminum current collector to a surface layer which is substantially hydrophilic and the step of forming a plurality of pores in the aluminum current collector may both comprise the step of etching the surface of the aluminum current collector. For example, such an etching agent may include utilization of hydrochloric acid with copper chloride—although other etching agents which provide the intended results are likewise contemplated.

In a preferred embodiment, the method further comprises the step of substantially precluding re-growth of an oxide layer on the surface of the aluminum current collector—wherein such a step may include applying a primer to the surface of the aluminum current collector. Accordingly, the layer of electrode material which enables electrochemical activity would thus be applied to the primer, and, in turn, adjacent to the electrolyte in the electrolytic cell.

BEST MODE FOR CARRYING OUT THE INVENTION

Figure 1:
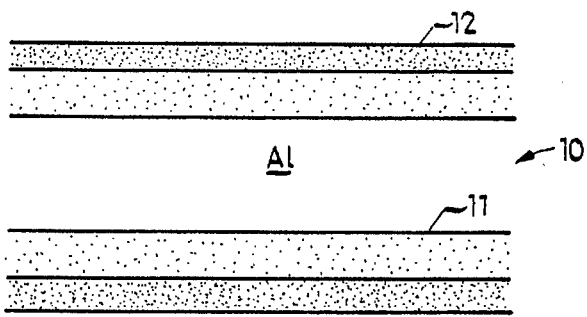
FIG. 1 is a sectional view of a prior art aluminum current collector.

While this invention is susceptible of embodiment in many different forms, there is shown in the drawings and will herein be described in detail, two specific embodiments with the understanding that the present disclosure is to be considered as an exemplification of the principles of the invention and is not intended to limit the invention to the embodiments illustrated.

A sectional view of a prior art aluminum current collector 10 is shown in FIG. 1 as comprising surface 11 and native oxide layer 12. As can be seen, this oxide layer, which typically comprise $Al_2O_3$, is extremely thick. As will be explained, such a thick native oxide layer not only inhibits adhesion of a layer of electrode material to the surface of the current collector, but it also acts as an insulator relative to electrochemical activity—thereby resulting in a current collector having a substantially high interfacial impedance.

Figure 2:
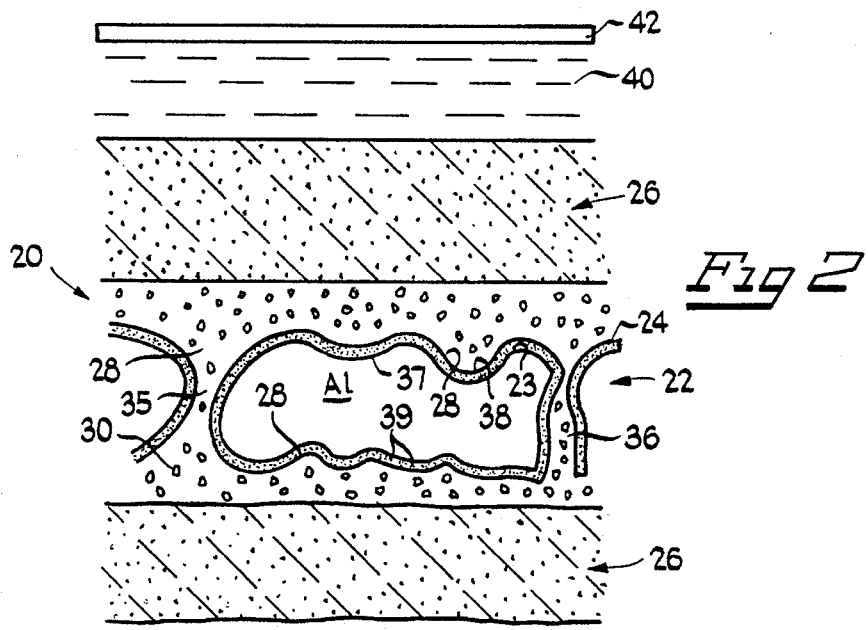
FIG. 2 is a sectional view of a preferred embodiment of the present current collector device.

The present current collector device 20 is shown in FIG. 2 as comprising aluminum current collector 22 having a surface 23, means for lowering interfacial impedance 24 (which comprises a substantially reduced non-$Al_2O_3$ oxidation layer, relative to the prior art), layer of electrode material 26, means for improving adhesion 28 of layer of electrode material 26, and, means for substantially precluding re-growth 30 of an oxide layer (such as $Al_2O_3$) on surface 23 of aluminum current collector 22.

Specifically, although an oxidation layer may exist on surface 23 of aluminum current collector 22, it will be substantially reduced in thickness, relative to the native oxide layer on an untreated, prior art, aluminum current collector, as shown in FIG. 1. Furthermore such a reduced oxidation layer will result in the aluminum current collector having a relatively low interfacial impedance as well. Inasmuch as such a native oxide layer on the surface of the aluminum current collector is undesirable, printer 30, is applied to surface 23 of aluminum current collector 22 to preclude re-growth of such an oxide layer thereon. Furthermore, as can be sen in FIG. 2, when such a primer is utilized, it will be applied directly to surface 23 of aluminum current collector 22. Accordingly, layer of electrode material 26 will thus be applied to the primer, and in turn, adjacent to electrolyte 40 within an electrolytic cell.

Figure 4:
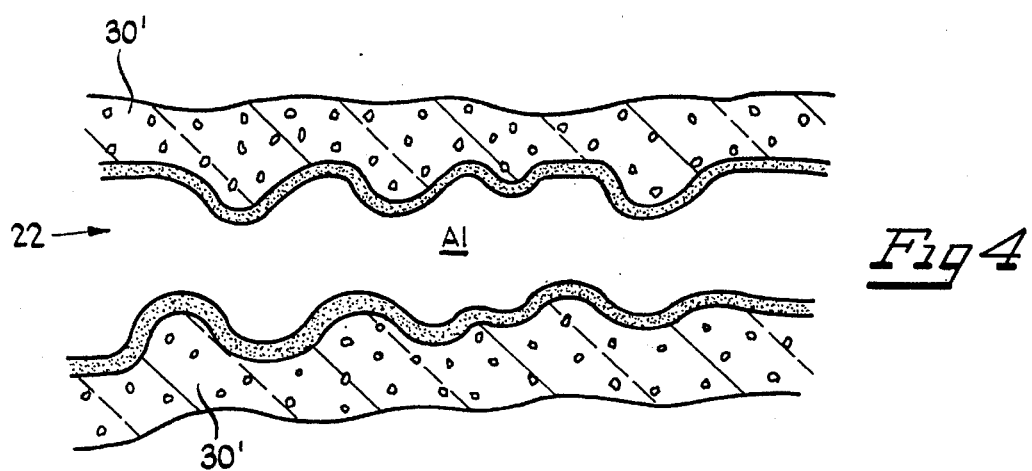
FIG. 4 is another preferred embodiment of the present current collector device.

Inasmuch as the primer (means for substantially precluding re-growth of an oxide layer) 30 primarily functions as a passive layer during an electrolytic process, it is preferred that the applied primer exhibit both electrochemical and chemical stability relative to the electrolyte and other electrode components (other than aluminum current collector 22), such as electrode 42 within an electrolytic cell. For example, such an acceptable primer material may include carbon, such as graphite or carbon-black—although other highly organized and non-organized carbons are likewise contemplated. Alternatively, the primer may comprise a carbon and transition metal oxide compound including, but not limited to, $LiMn_2O_4$+C; $LiCoO_2$+C; or $LiNiO_2$+C, among others. Additionally, and as shown in FIG. 4, it is likewise contemplated that primer 30' be composed of, for example, carbon and an intercalation compound of a transition metal oxide. Accordingly, such a primer would actually serve a dual role, specifically, it would: 1) serve as a means to substantially preclude re-growth of an oxide layer; and 2) as a result of the intercalation compound, function as a layer of electrode material (enabling electrochemical activity with surface 23 of aluminum current collector 22) as well.

Layer of electrode material 26 is shown in FIG. 2 as comprising a separate layer applied directly to primer 30, and, in turn, adjacent electrolyte 40. Such a layer may include a transition metal oxide such as LiCoO2; $LiMn_2O_4$; $LiNiO_2$; $LiV_3O_8$; $V_2O_5$; and $V_6O_{13}$; although other acceptable compounds which enable electrochemical activity with the particular ions (such as lithium ions, in an associated electrolyte), are also contemplated for use.

Means for improving adhesion 28 of layer of electrode material 26 may alternatively be used for improving the adhesion of primer 30 (FIG. 2) to the surface of the aluminum current collector—when a primer is to be used in association with a layer of electrode material. If a primer is not to be used, then the layer of electrode material would be applied directly, as opposed to indirectly, to surface 23 of aluminum current collector 22.

Figure 3:
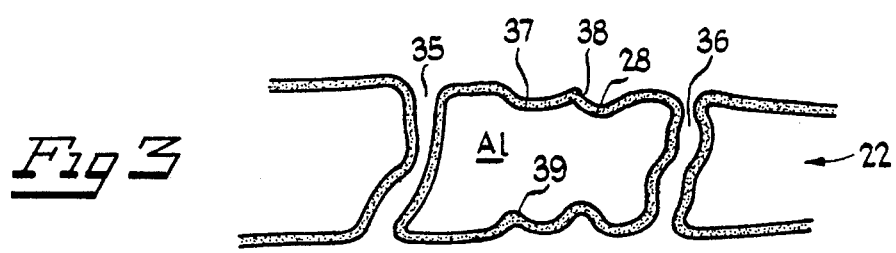
FIG. 3 is a sectional view of the aluminum current collector of the present current collector device.

As shown in FIG. 2 and FIG. 3, means for improving adhesion 28 comprises a plurality of pores 35 through 39, which, in turn, result in an aluminum current collector having a substantially porous surface. As can be seen, such pores may extend all the way through the transverse dimension of the aluminum current collector 22, as exemplified by pores 35 and 36, and/or they may only partially penetrate through the aluminum current collector, to, in turn, exhibit a crater-like appearance, as exemplified by pores 37 through 39. Such a porous surface of the particular current collector material enables such a primer 30, or layer of electrode material 26, to penetrate, and, in turn, become anchored within the pores (as shown in FIG. 2). Accordingly, such anchoring will provide increased adhesion, and, in turn, a tight bond between the current collector material and surface 23 of the aluminum current collector; wherein such a tight bond will further contribute to maintaining a relatively low interfacial impedance between aluminum current collector 22 and layer of electrode material 26.

The method of manufacturing current collector device 20, (FIG. 2) comprises, in a preferred embodiment, an initial step of etching surface 11 (FIG. 1) of a conventional aluminum current collector 10. Such an etching serves to substantially remove native oxide layer 12 (FIG. 1), which may comprise $Al_2O_3$, which is found on the untreated aluminum current collector (FIG. 1). Accordingly, such an eliminated oxide layer will thus result in an aluminum current collector having a substantially low interfacial impedance relative to prior art aluminum current collectors.

Figure 6:
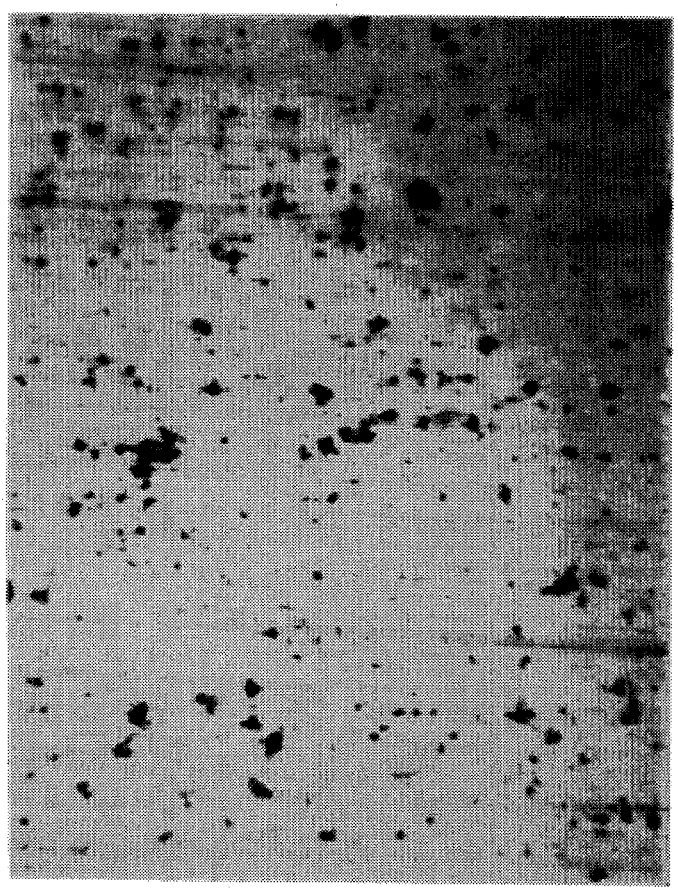
FIG. 6 is a microphotograph of an etched piece of aluminum foil.
Figure 7:
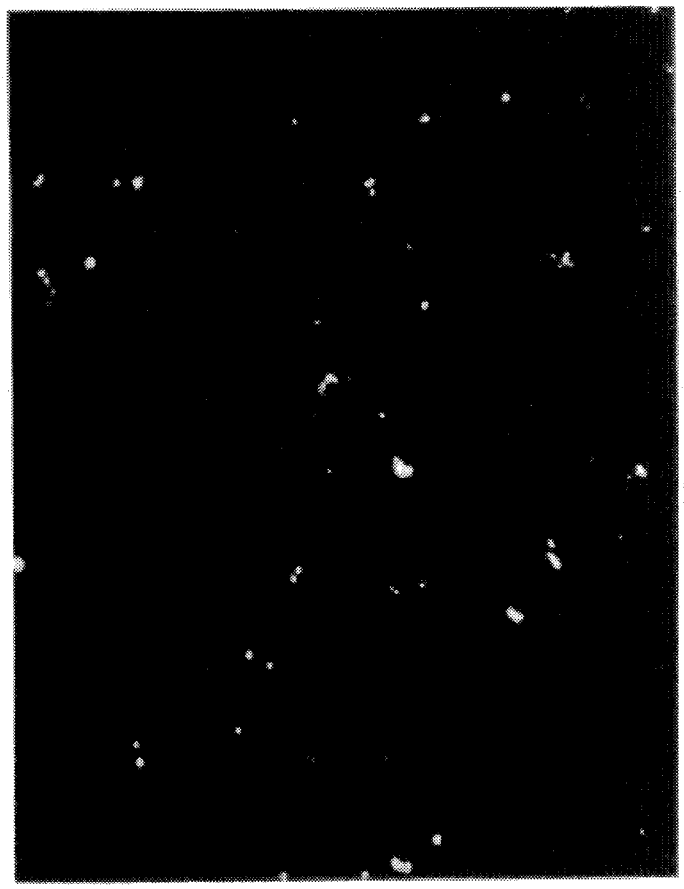
FIG. 7 is a microphotograph of an etched piece of aluminum foil.

In addition, such etching further serves to improve adhesion between a current collector material, such as primer 30 (FIG. 2) and/or a layer of electrode material 26, to surface 23 (FIG. 2) of the aluminum current collector. This increased adhesion can be attributable to main factors: 1) such an etching procedure actually results in a conversion of the surface of the aluminum current collector from one which is initially hydrophobic, to one which is substantially hydrophilic; and 2) the etching results in the formation of pores in the aluminum current collector (as can be seen in FIG. 6 and FIG. 7, which are both microphotographs of an etched piece of aluminum foil).

Figure 5:
FIG. 5 is a microphotograph of an untreated/unetched piece of aluminum foil.

In support of such an etching procedure, an experiment was conducted wherein a piece of aluminum foil (aluminum current collector) was treated with a solution of aqueous hydrochloric acid with copper chloride, by brushing it on to the surface for 30 to 60 seconds. Before treatment, the foil was substantially non-porous, as shown in the microphotograph of FIG. 5. However, after the treatment, the porosity was easily seen. (See FIG. 6 and FIG. 7). Indeed, while some of such pores only partially penetrated through the aluminum foil, others completely penetrated therethrough, as can be seen in the microphotograph of FIG. 7, which was taken using back-transmitted lighting. As previously explained, such a porous surface, among other things (e.g. the hydrophilic surface and reduced oxide layer), served to substantially improve contact and adhesion of the current collector material to the surface of the aluminum current collector.

After the foil was etched, it was then dried at 300° C. before further coating or processing. After such drying, the foil surface proved to be substantially hydrophilic, and, in turn, was easily wetted by water and solvents. Although hydrochloric acid with copper chloride was utilized as the etching agent in this experiment, other etching agents, such as sodium hydroxide and acids such as sulfuric, chromic and phosphoric, to name a few alternative etching agents, are also contemplated for use.

After the surface was etched, it was then coated with submicron graphite Asbury 85110 graphite dispersion, and, any residual organic surfactants were removed by heating it in air at 400° C. for 3 minutes. A graphite coating that was tightly bonded to the foil surface was then obtained. Furthermore, this coating proved to substantially preclude regrowth of an oxide layer on the surface of the aluminum current collector. Although graphite was used as the primer in this experiment, other types of primer materials, such as other highly organized and non-organized carbons, as well as primers which include a compound selected from the group of materials comprising carbon and a transition metal oxide, to name a few, are also contemplated for use.

After the primer was applied, the graphite coated foil (aluminum current collector) was then further treated with an aqueous solution of $LiNO_3 + Mn(NO_3)_2$ and dried. The dried nitrates were then converted to oxides by heating at 400° C. for 3 minutes to, in turn, result in a layer of electrode material, such as layer of electrode material 26 (FIG. 2) applied to primer 30. Accordingly, the foil sample (aluminum current collector) demonstrated a substantially lower interfacial impedance relative to non-treated aluminum current collectors, as well as further exhibiting the required electrochemical activity between the layer of electrode material and the surface of the aluminum foil. Although the layer of electrode material so formed in this experiment included $LiMn_2O_4$, other layers of electrode material (such as other intercalation compounds selected from the group of transition metal oxides) which enable electrochemical activity between the layer of electrode material and the aluminum current collector are also contemplated for use. In addition, while such a cathode material was applied in the form of an aqueous solution, other means of applying a layer of electrode material to the surface of the aluminum current collector, such as by a thermal cure paste, are also contemplated.

Although not specifically depicted, it will be recognized to those with ordinary skill in the art that the present aluminum current collector may be used in an electrolytic cell, such as a rechargeable lithium battery. Additionally, it will also be recognized that the aluminum current collector may comprise a cathode, or, alternatively, another electrode within an electrolytic cell.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A current collector device for use in a lithium electrolytic cell comprising:

a current collector constructed from aluminum, wherein the aluminum current collector has an interfacial impedance relative to current collection;

means for lowering the interfacial impedance of the aluminum current collector wherein the aluminum current collector has a surface with a reduced native oxide layer relative to a native oxide layer;

means for precluding re-growth of an oxide layer on the surface of the aluminum current collector to, in turn, maintain the lowered interfacial impedance, the means for precluding re-growth of an oxide layer including a primer material devoid of water applied and adhered to at least a portion of the surface of the aluminum current collector.

2. The current collector device according to claim 1 further comprising means for improving adhesion of at least one of the primer material or a layer of electrode material to the aluminum current collector.

3. The current collector device according to claim 2 wherein the means for improving adhesion includes a plurality of pores formed in the aluminum current collector.

4. The current collector device according to claim 3 wherein the aluminum current collector includes a transverse dimension and at least one of the plurality of pores extend through the transverse dimension.

5. The current collector device according to claim 3 wherein the aluminum current collector has a transverse dimension and at least one of the plurality of pores extends through only a portion of the transverse dimension, to, in turn, create at least one pore having a crater-like appearance.

6. The current collector device according to claim 1 wherein the primer material is selected from a group of materials which are substantially electrochemically stable and substantially chemically stable relative to the electrolyte and another electrode within the electrolytic cell.

7. The current collector device according to claim 1 wherein the primer material includes carbon.

8. The current collector device according to claim 1 wherein the primer material is selected from the group of materials comprising carbon and a transition metal oxide.

9. The current collector device according to claim 1 further including a layer of electrode material which enables electrochemical activity, the electrode material including an intercalation compound selected from the group comprising transition metal oxides.

* * * * *